July 24, 1923.
O. H. PIEPER ET AL
DENTAL APPLIANCE UNIT
Filed Sept. 14, 1920
1,462,656
5 Sheets-Sheet 1
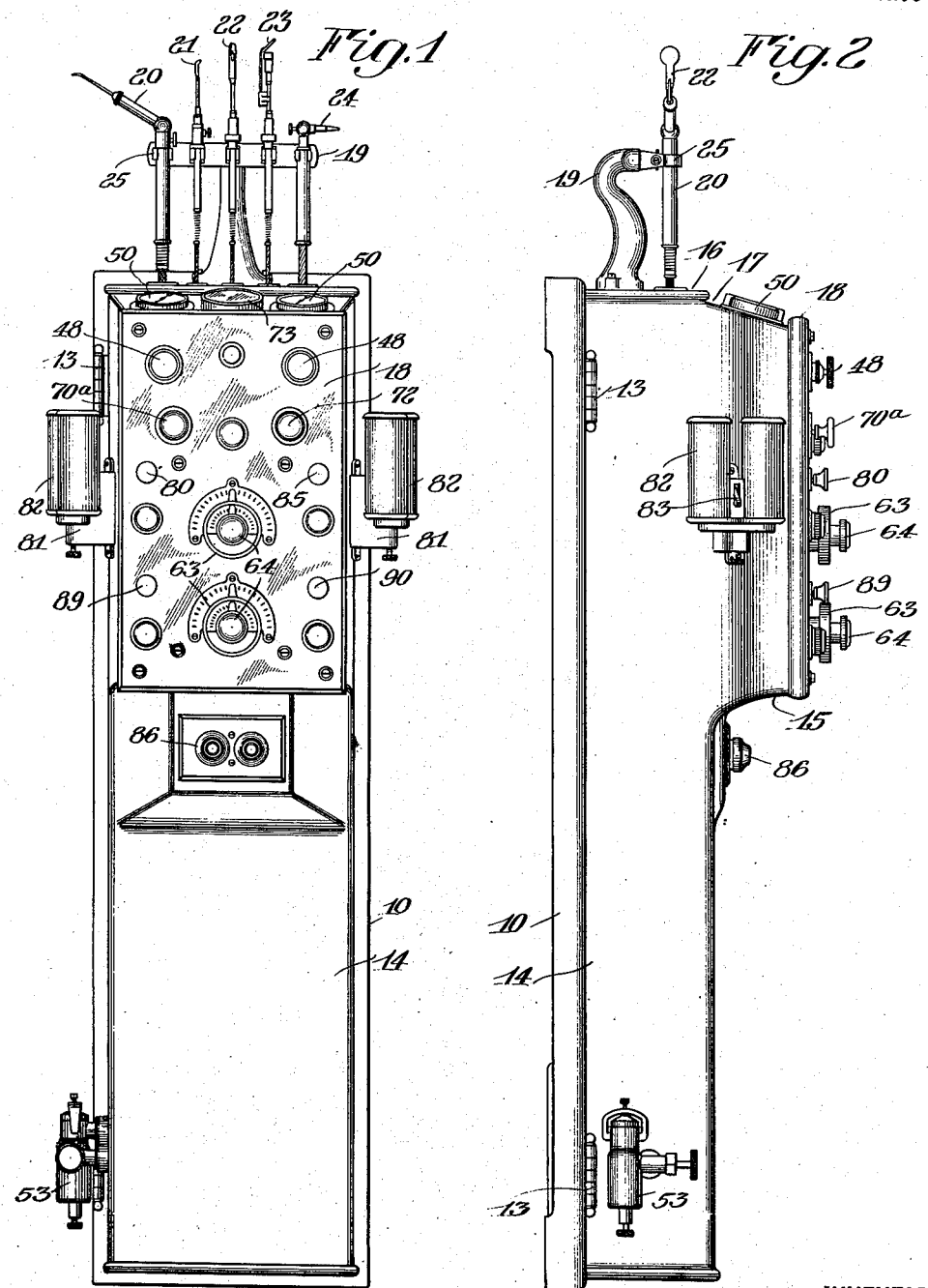
INVENTORS
Oscar H. Pieper
BY Alphonse F. Pieper
their ATTORNEY

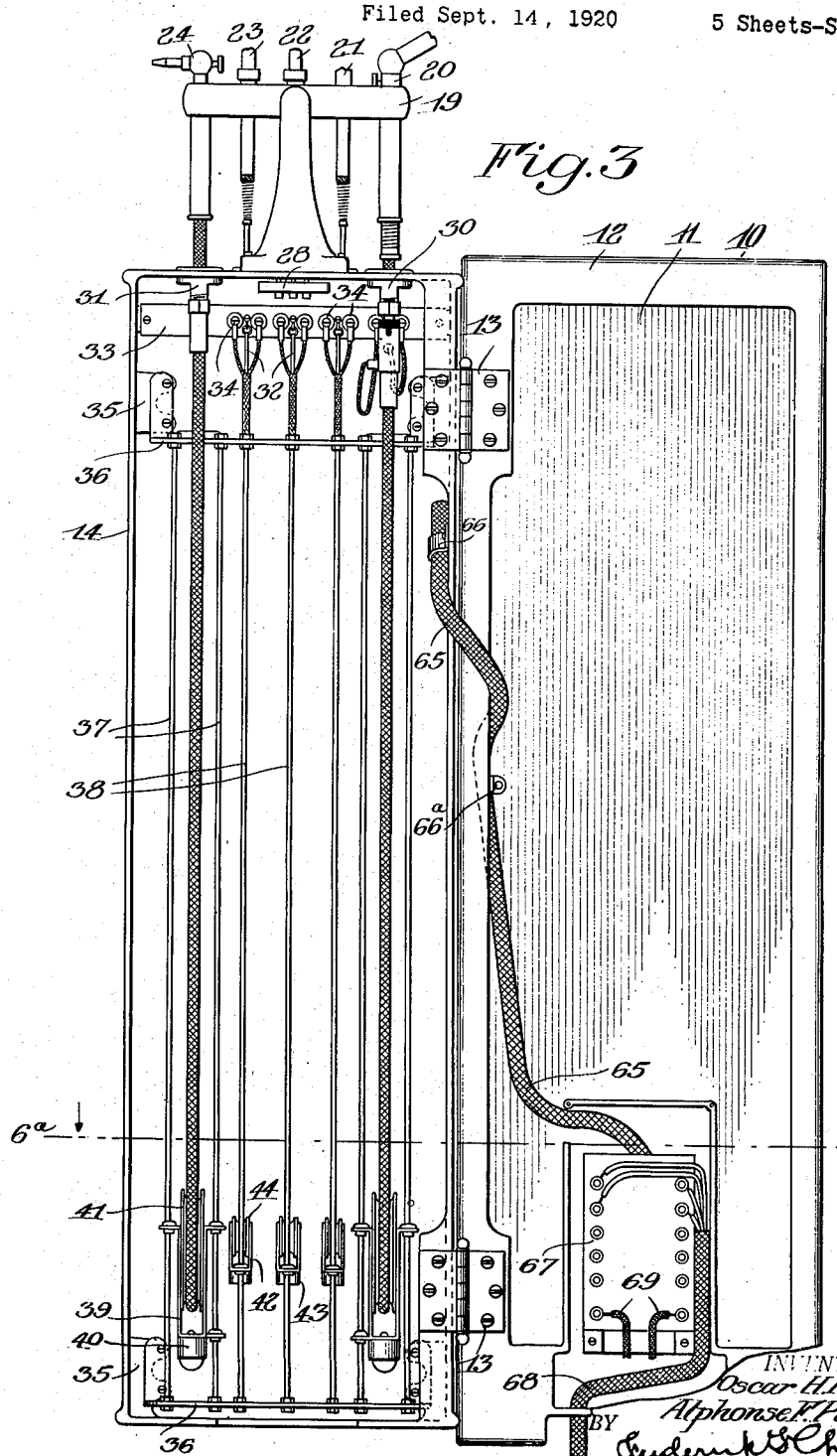

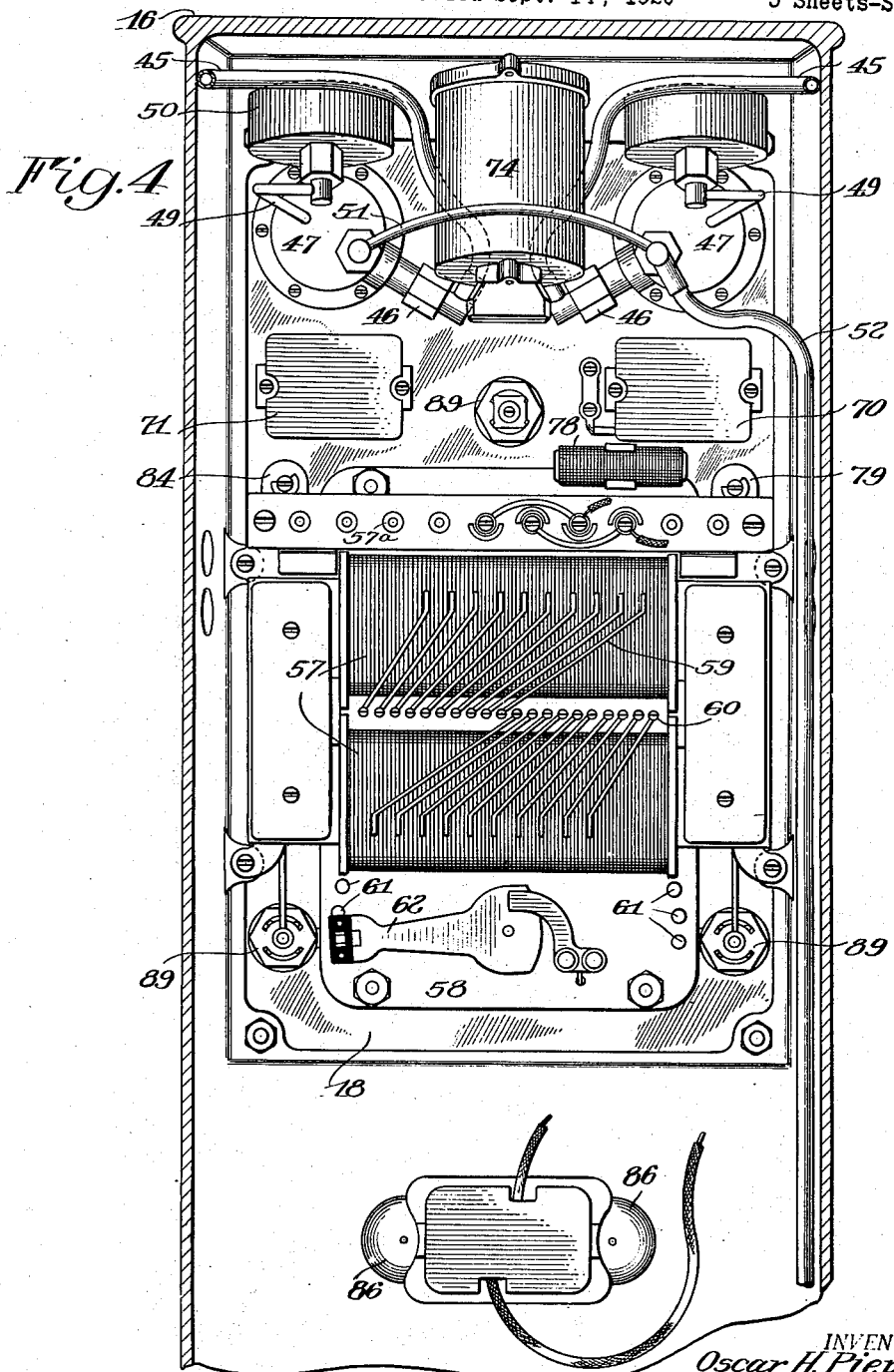

July 24, 1923.

O. H. PIEPER ET AL 1,462,656

DENTAL APPLIANCE UNIT

Filed Sept. 14, 1920

INVENTORS
Oscar H. Pieper
Alphonse F. Pieper
BY Frederick J. Church
their ATTORNEY

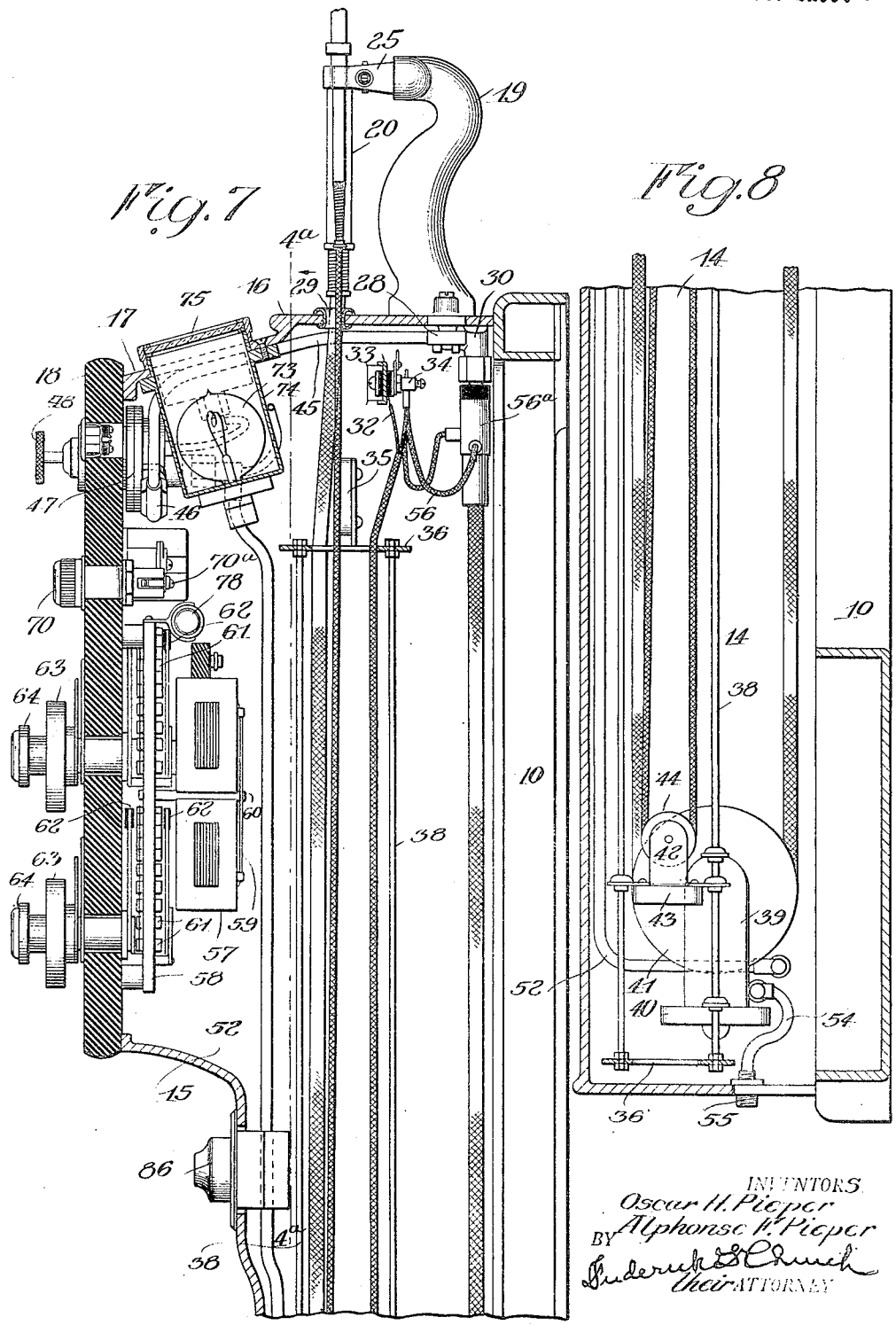

Patented July 24, 1923.

1,462,656

UNITED STATES PATENT OFFICE.

OSCAR H. PIEPER AND ALPHONSE F. PIEPER, OF ROCHESTER, NEW YORK.

DENTAL-APPLIANCE UNIT.

Application filed September 14, 1920. Serial No. 410,241.

*To all whom it may concern:*

Be it known that we, OSCAR H. PIEPER and ALPHONSE F. PIEPER, of Rochester, county of Monroe, and State of New York, have invented certain new and useful Improvements in Dental-Appliance Units; and we do hereby declare the following to be a full, clear, and exact description of the same, reference being had to the accompanying drawings, forming a part of this specification, and to the reference numerals marked thereon.

This invention has to do with dental appliances and relates more particularly to combinations of a plurality of such appliances in self-contained units. The increasing number and complexity of instruments and accessories required, together with the restriction in room space to which dentists are more or less subjected, render it imperative to combine such apparatus into self-contained units for purposes of convenience and compactness and in order that the operating and controlling devices for the instruments may be united in a single mechanism, especially in the case of instruments requiring the supply of electricity in regulated current and voltage. The present invention is in the nature of an improvement upon the apparatus of the above character disclosed in Letters Patent of the United States No. 1,211,752 granted to us jointly January 9, 1917, the chief object being to provide a practical and efficient apparatus of the type specified but of a more complete, self-contained and convenient character.

To these and other ends the invention consists in certain improvements and combinations of parts all as will be hereinafter more fully described, the novel features being pointed out in the claims at the end of the specification.

In the drawings:

Figure 1 is a front elevation of a unitary apparatus embodying the present invention.

Figure 2 is a side elevation of the same.

Figure 3 is a view similar to Figure 1 but enlarged, with the casing swung open to show the interior thereof.

Figure 4 is a sectional view substantially on the line 4ª—4ª of Figure 7, further illustrating the interior of the casing.

Figures 7 and 8 are vertical central sections of the apparatus as viewed from the right in Figure 1, with parts broken away.

Similar reference numerals through the several views indicate the same parts.

Figure 6:
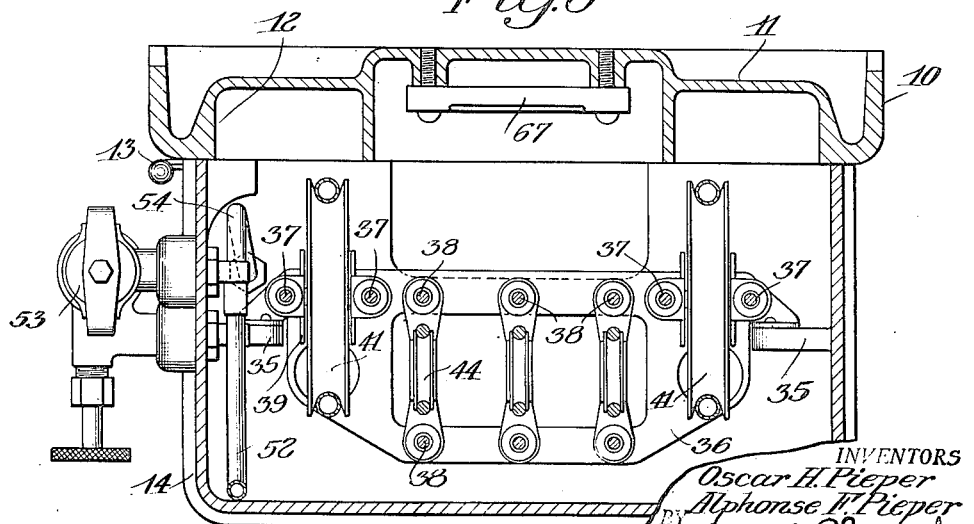
Fig. 6 is a sectional view substantially on the line 6ª—6ª of Figure 3 but with the casing in closed position.

The present embodiment of the invention is disclosed herein primarily by way of illustration of the principles involved, and is capable of various modifications and adaptations, comprising, preferably, a support 10 of generally plate-like form adapted to be secured on a wall or other vertical surface adjacent the dental chair and preferably on the left of the latter to bring the various appliances or instruments and control devices within convenient reach of the dentist in his working position. The support is preferably of metal having a main wall 11, Figures 3 and 6, around the sides of which is a forwardly extending flange 12 on which are secured hinges 13 for movably supporting the main casing so that the latter may be swung toward and from the support for ready access to interior parts. The casing has a substantially rectangular lower portion relatively shallow in depth, and a forwardly extending upper portion 15 with a substantially horizontal top 16 and a forwardly and downwardly inclined portion 17 uniting the top and front thereof. On the front of the portion 15 is the control panel 18, the casing being preferably of metal, and the panel of marble or other suitable ornamental material.

Figure 5:
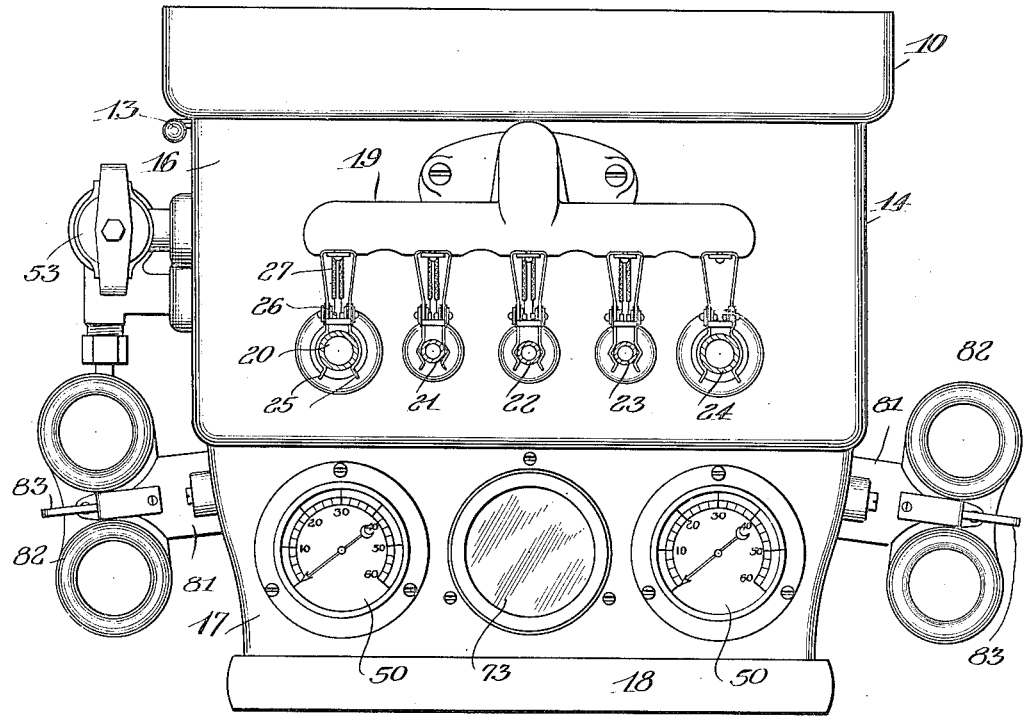
Figure 5 is an enlarged top plan view of the apparatus.

A plurality of operating instruments are provided at the top of the casing, and for supporting the same there is fixed on the top portion, 16, an instrument bracket 19 rising therefrom and carrying a plurality of the most essential instruments such, for example, as a hot air syringe 20, cautery 21, a holder 22 for miscellaneous detachable instruments, an examination lamp 23 and an air nozzle 24 for use in conjunction with one of a plurality of atomizers or fluid containers, for mouth washes or antiseptic solutions. Other instruments may of course be provided and similarly supported, these, however, being deemed the most important ones. The instruments are each supported preferably by insertion of the handle thereof between a pair of spring clips or arms 25 on the bracket 19. As shown in Figure 5 these spring arms are formed to embrace and yieldably retain the instrument and are provided with electrical contacts 26 separated when the instrument is in position between the clips, but adapted to be engaged with each other when the instrument is removed and the clips allowed to spring together, the construction of these holders being substantially that disclosed in Letters Patent of the United States No. 1,278,997 granted to us jointly September 17, 1918, so that more detailed description thereof herein appears unnecessary. From the contacts 26 conductors 27 are led into the bracket arm and through the upright portion of the bracket to binding posts on a block 28 within the casing.

The instruments 20 and 24 require the supply of air under pressure, and instrument 20 requires in addition a supply of electrical current as do also the instruments 21, 22 and 23, and to this end the handle of each of the instruments has attached thereto one end of a flexible conductor which passes downwardly through an opening 29 in the top of the casing, and is looped within the latter, so that the instruments may be removed from the bracket and carried to the place of use. The air conductors or hose for instruments 20 and 24 have their other ends secured to coupling members 30, Figure 7, carried on the under side of the top of the casing at the rear of the latter, the couplings being connected to a source of air supply as described hereafter. The other ends of the conductors or circuit cords for instruments 21, 22 and 23, are secured by attaching means 32, Figures 3 and 7, to a cross bracket 33 in the casing, this bracket being provided with a pair of electrical contacts 34 for each of the cords to which the circuit wires of the latter as well as the conductor for instrument 20 are connected, current being supplied to these contacts by means described later on.

The means for retracting the conductors for the instruments within the casing when the instruments are returned to their supporting bracket comprises preferably lugs 35 on the side walls of the casing adjacent the top and bottom of the latter, Figure 3, to which lugs are secured plate-like transverse frames 36. Secured at their ends to the frame members are pairs of vertical guide rods 37 and 38, the rods of each pair 37 being in alinement with each other transversely of the casing and the rods of each pair 38 in alinement from front to rear of the same. Slidably carried on each pair of rods 37 is a frame 39, provided with a weight 40, and with a rotatably supported pulley 41 engaging the loop portions of the respective air hose which latter extend substantially to the bottom of the casing when the instruments are not in use. Similarly each pair of rods 38 carries a sliding frame 42 having a weight 43 and a rotatable pulley 44 engaging the loop portion of the circuit cord of the respective instruments 21, 22 and 23, by which means the flexible conductors for the instruments may be extended from the casing but are automatically retracted thereinto when the instruments are returned to the bracket, and the looped portions of the conductors are guided and maintained in their allotted spaces in the casing.

The means for supplying air to the conductors of the pneumatic instruments 20 and 24 comprises pipes 45 connected with the couplings 30 and led forwardly below the top of the casing to couplings 46 by which they are connected to pressure regulating valves 47 adjusted by means of handles 48 extending through to the front of the control panel. From these valves pipes 49 convey the regulated pressure to indicators or pressure gauges 50 located on the inclined portion 17 of the casing and conveniently visible from the front of the latter. Air is supplied to the valves by means of communicating pipes 51 and 52, respectively, the latter being led down one side of the casing to an air filter 53 of the usual or any suitable construction well known in the art, and preferably located outside the casing adjacent the bottom of the latter. From the filter a pipe 54 within the casing leads to a coupling 55 in the bottom of the latter adapted for connection with a flexible air hose from a source of supply. To provide the heating current for instrument 20, conductors 56 are preferably led from corresponding binding posts 34 on the cross bracket 33 to the coupling 56 through which the upper end of the corresponding air hose is connected to its coupling 30, the electrical conductors being led interiorly of the air hose to the instrument.

The means for regulating and controlling the electrical current for the various instruments comprises, preferably, a transformer 57 supported on the rear side of a distributing board 58 fixed on the rear of the panel 18, Figure 7. Leads 59, Figure 4, which tap the secondary coils of the transformer at various points, are connected with a series of contacts 60 extending through the distributing board and being connected in turn with respective ones of a plurality of contacts 61, arranged in two arcs, one above the other, on the board 58 and extending through both sides of the latter. Co-operating with each set or arc of contacts 61, are two switch arms 62, the arms for each set of contacts being on opposite sides of the board so as to avoid interference with each other. Each arm 62 is rotatably supported in the board, the arms of each set of contacts being concentrically arranged and having handles 63 and 64 one within the other projecting through the front of panel 18 and provided with suitable pointers and graduations for the adjustment of the respective arms. The electrical connections of the apparatus are substantially as shown in Patent No. 1,211,752 referred to above, and detailed description thereof appears unnecessary further than to explain for convenience in the present instance that the transformer switch arms 62 are connected with respective contacts 34 on the cross bracket 33 and the regulated current passes thence through the circuit cords and instruments and back to other contacts on the bracket and thence to respective contacts on the block 28 from which connection is made through the contacts of the spring arms of the instrument holders back to the central contacts on the block which are connected with the secondary coils of the transformer, thus forming complete circuits through the instruments and through the switches in the holders for the latter so that the circuit for any instrument is automatically completed only while the instrument is removed from its holder for use and is broken when the instrument is returned to the bracket. The primary coils of the transformer are adapted for connection with a series of binding posts 57ª on the back of the panel and the posts are adapted for interconnection in the manner set forth in the patent referred to, depending upon the voltage and nature of the line current supplied to the apparatus. Two of said contacts 57ª are connected through a conduit 65, Figure 3, fixed at one end by means of a clip 66 on the casing, and secured by means of a clip 66ª on the support so as to permit the opening and closing movement of the casing described without interruption of the circuits, the conduit being led down the support to a distributing board 67 on the latter adjacent its bottom, Figure 3, from which connections may be made through a conduit 68 with a rotary or other type converter such as is usually supplied with apparatus of this character for use where the power is of the direct current type. The main supply line is shown at 69 connected with the distributing board from which the line is carried through conduit 65 to a main switch 70 on the rear of the panel and operated by handle 70ª extending through the panel. A connection is made from the main switch to the converter through a switch 71 for controlling the low voltage circuits, so that by means of these switches the whole apparatus or the low voltage circuits alone may be electrically disconnected at the panel, the low voltage switch being provided with a handle 72 on the latter.

For the purpose of quickly indicating whether the main switch is closed, not only as a matter of convenience in the operation of the apparatus, but also as a warning signal to prevent leaving the apparatus connected for long periods of time, there is provided a pilot lamp 73 connected across the main switch and this lamp in the present instance is so constructed that the voltage applied thereto may be increased to adapt it for purposes of illumination, as for example, in the study of X-ray photographic negatives. To this end the lamp 73, Figure 7, is enclosed in a casing 74 provided with an opaque plate 75 located on the inclined portion of the casing, the lamp including in its circuit a switch 79 controlled by handle 80 on the panel. Across switch 79 is connected a resistance element 78 so that the latter is included in the lamp circuit when the lamp is used as a pilot lamp, with switch 79 open, but with switch 79 closed, resistance 78 is bridged, thereby increasing the voltage on the lamp and its illuminating power for the purpose described.

For conveniently heating the fluid containers or atomizers with which the air nozzle 24 is employed, there are provided, on the sides of the casing brackets 81 each supporting a pair of electric heating means or receptacles 82 each adapted to receive a fluid container and having heating coils in its walls, the receptacle being preferably provided with switches indicated at 83, Figure 5, for regulating the degree of heat. The heaters are in a high voltage circuit connected across the main switch and controlled by a switch 84 having a handle 85 on the panel by means of which they may be placed in or out of operation.

A pair of sockets 86 are provided on the front of the casing below the panel, connected in a high voltage circuit across the main switch for the convenient connection and operation of the dental engine, fan or other apparatus as may be desired. At 89 and 90 are switches in other high voltage circuits connected across the main switch and connected through the conduit 65 with contacts on distributing board 67 on the support, to provide convenient connection for any other auxiliary high voltage apparatus which it may be desired to operate.

The operation of the apparatus is apparent from the above description. The unit is preferably located at the left of the dental chair within convenient reach of the dentist so that from the panel he may conveniently control the various operating devices and the conditions of operation of the various appliances as desired, the instruments conveniently within reach for removal from their bracket and return thereto as required, the cord connections therefor extending from and returning to the case with the movement of the instrument, by means which, as well as the cords themselves, are contained within the case. In this and other respects the apparatus is fully self-contained and compact in construction and arrangement. The controlling devices are conveniently assembled in close relation on a single panel above which the pilot lamp indicates the position of the main switch and the latter when desired may be quickly converted into a source of illumination for the investigation of the results of photographic X-ray work. When secured to the wall or other vertical support the unit as a whole occupies a minimum of space and presents a neat and attractive appearance.

We claim as our invention:

1. A dental appliance unit comprising a support, a panel mounted thereon for movement toward and from the same to afford access to the rear of the panel, an instrument bracket extending upwardly from the panel, a plurality of electrical instruments carried by the bracket, controlling devices for said instruments located on the panel, and electrical connections between said controlling devices and instruments including circuit cords looped in rear of the panel to permit the removal and use of said instruments.

2. In a dental appliance unit, a casing including a rear supporting portion and a forward portion movable toward and from said rear portion to afford access to the casing interior, instrument carrying means on the casing, a plurality of instruments removably held by said carrying means, devices on the casing connected with power supplying means for controlling said instruments, and extensible conductors located within said casing and connecting said controlling devices and instruments to permit the removal and use of the instruments.

3. A dental appliance unit comprising a support, a panel pivotally mounted thereon for movement toward and from the same to afford access to the rear of the panel, an instrument bracket extending upwardly from the panel, a plurality of electrical instruments carried by the bracket, controlling devices for said instruments located on the panel, electrical connections between said controlling devices and instruments including circuit cords looped in rear of the panel to permit the removal and use of the instruments, guide rods on the rear of the panel, and weights movable over said rods and provided with pulleys engaging the looped portions of said cords for retracting the same in rear of the panel.

4. In a dental appliance unit, a casing including a rear supporting portion and a forward portion movable toward and from said rear portion to afford access to the casing interior, instrument carrying means on the casing, a plurality of instruments removably held by said carrying means, devices on the casing connected with power supplying means for controlling said instruments, extensible conductors located within said casing and connecting said controlling devices and instruments to permit removal and use of the instruments, and means for retracting said conductors within the casing upon return of said instruments to said carrying means.

5. A dental appliance unit comprising a support, a panel pivotally mounted thereon for movement toward and from the same to afford access to the rear of the panel, instrument carrying means on the panel, a plurality of pneumatic and electric instruments carried by said means, controlling devices for said instruments located on the panel, pneumatic and electric connections between said controlling devices and instruments including flexible hose and circuit cords looped in rear of the panel to permit movement of said instruments, guide rods on the rear of the panel, and weights movable over said rods and having pulleys engaging the looped portions of said hose and cords to retract the same in rear of the panel.

6. A dental appliance unit comprising a support, a panel mounted thereon for movement toward and from the same to afford access to the rear of the panel, an instrument bracket extending upwardly from the panel, a plurality of electrical instruments carried by the bracket, controlling devices for said instruments located on the panel, conductors on said support connected with a source of power and also with said controlling devices in both open and closed positions of the panel, a bracket on the rear of the panel provided with contacts connected with said controlling devices, and circuit cords for connecting said contacts and instruments, said cords being looped in rear of the panel to permit movement of said instruments.

7. A dental appliance unit comprising a support, a panel mounted thereon for movement toward and from the same to afford access to the rear of the panel, instrument carrying means on the panel, a plurality of electric and pneumatic instruments carried by said means including a fluid dispensing pneumatic instrument for use with a container, electric heating means for the container adjacent the panel, controlling devices for said instruments and heating means on the panel, connections between said heating means and controlling devices and between the latter and said instruments including circuit cords looped in rear of the panel to permit movement of said instruments.

8. A dental appliance unit comprising a support, a panel mounted thereon for movement toward and from the same to afford access to the rear of the panel, an instrument bracket extending upwardly from the panel, a plurality of electrical instruments carried by the bracket, controlling devices for said instruments located on the panel including a main switch, conductors on said support connected with a source of power and with said main switch in both open and closed position of the panel, a pilot lamp on the panel normally indicating the position of said main switch and means for increasing the voltage on said lamp for purposes of illumination, and electrical connections between said controlling devices and instruments including circuit cords looped in rear of the panel to permit movement of said instruments.

9. A dental appliance unit comprising a support, a panel mounted thereon for movement toward and from the same to afford access to the rear of the panel, an instrument bracket extending upwardly from the panel, a plurality of electric instruments carried by the bracket, conductors for a plurality of electric circuits on the panel including circuit cords connected with said instruments and looped in rear of the panel, and conductors on said support connected with a source of power and with said panel circuit conductors in open and closed positions of the panel.

10. A dental appliance unit comprising a support, a casing mounted thereon for movement toward and from the same for access to the interior of the casing, said casing having a substantially horizontal top portion and an inclined portion connecting the top portion and front thereof, an instrument bracket on said top portion, a plurality of pneumatic and electric instruments carried by said bracket, controlling devices for said instruments on the casing including pressure indicating means located on said inclined portion and visible from the front thereof, and hose and circuit cord connections from said controlling devices looped inside the casing and leading through said top portion thereof for connection with said instruments.

11. A dental appliance unit comprising a support, a casing mounted thereon for movement toward and from the same for access to the interior of the casing, said casing having a substantially horizontal top portion and an inclined portion connecting the top portion and front thereof, an instrument bracket on said top portion, a plurality of pneumatic and electric instruments carried by said bracket, controlling devices for said instruments on the casing including pressure indicating means located on said inclined portion and visible from the front thereof, hose and circuit cord connections from said controlling devices looped inside the casing and leading through said top portion thereof for connection with said instruments, transverse frames in said casing adjacent the top and bottom thereof, guide rods connecting said frames, and weights sliding on said rods and provided with pulleys engaging the looped portions of said hose and cords to retract the same.

12. A dental appliance unit comprising a support, a casing mounted thereon for movement toward and from the same for access to the interior of the casing, said casing having an enlarged upper portion with a substantially horizontal top and an inclined portion connecting the top and front thereof, a control panel on the front of said upper portion, an instrument bracket on said top portion, a plurality of pneumatic and electric instruments carried by said bracket, transformer means in said enlarged casing portion for said electric instruments, pressure regulating means in said enlarged casing portion for said pneumatic instruments, pressure indicators for the latter on said inclined portion of the casing and visible from the front of the latter, flexible connections from said transformer and pressure regulating means to said instruments looped within the casing, and means in the latter for retracting said flexible connections.

OSCAR H. PIEPER.
ALPHONSE F. PIEPER.